(12) United States Patent
Ichihara et al.

(10) Patent No.: US 11,874,546 B2
(45) Date of Patent: Jan. 16, 2024

(54) DISPLAY DEVICE

(71) Applicant: Japan Display Inc., Tokyo (JP)

(72) Inventors: Kazuki Ichihara, Tokyo (JP); Naoyuki Asano, Tokyo (JP); Motoki Tsuda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/110,394

(22) Filed: Feb. 16, 2023

(65) Prior Publication Data
US 2023/0280609 A1 Sep. 7, 2023

(30) Foreign Application Priority Data
Mar. 7, 2022 (JP) .................. 2022-034678

(51) Int. Cl.
*G02F 1/1333* (2006.01)
*G02F 1/1334* (2006.01)
*G02F 1/13357* (2006.01)

(52) U.S. Cl.
CPC ...... *G02F 1/133308* (2013.01); *G02F 1/1334* (2013.01); *G02F 1/133615* (2013.01)

(58) Field of Classification Search
None
See application file for complete search history.

(56) References Cited

U.S. PATENT DOCUMENTS

| | | | |
|---|---|---|---|
| 2014/0185320 A1* | 7/2014 | Wang He | G02B 6/0028 362/610 |
| 2017/0168230 A1* | 6/2017 | Byun | G02B 6/0091 |
| 2017/0352329 A1* | 12/2017 | Imai | G09G 3/36 |
| 2021/0223465 A1* | 7/2021 | Numata | G02F 1/133615 |
| 2022/0171222 A1 | 6/2022 | Gou et al. | |

* cited by examiner

*Primary Examiner* — Phu Vu
(74) *Attorney, Agent, or Firm* — Michael Best & Friedrich LLP

(57) ABSTRACT

A display device includes a display panel including a polymer-dispersed liquid crystal layer between a pair of substrates, a transparent substrate disposed on at least one side of the display panel, and a lighting unit configured to project light from the side of the transparent substrate. The lighting unit includes at least one light source, at least one light guide incident with the light emitted from the light source, and a support member having an L-shaped cross section and extending along one side of the display panel to which the at least one light source and the at least one light guide are fixed. The at least one light source and the at least one light guide are disposed on different sides of the support member. The lighting unit is fixed to the transparent substrate or the display panel by the support member.

13 Claims, 13 Drawing Sheets

DISPLAY DEVICE

CROSS-REFERENCE TO RELATED APPLICATIONS

This application claims the benefit of priority to Japanese Patent Application No. 2022-034678, filed on Mar. 7, 2022, the entire contents of which are incorporated herein by reference.

FIELD

An embodiment of the present invention relates to a structure of a display device including a display panel and a lighting unit.

BACKGROUND

Most of the displays installed in smartphones and tablet devices on the market do not allow the view behind them to be seen through the screen. On the other hand, a display device called a "transparent display" has been developed, which can display images, text, and graphics, but is as transparent as window glass when not displaying images, allowing the viewer to see the view behind the display device through the screen. For example, Japanese Unexamined Patent Application Publication No. 2021-033043 discloses a display device having a display screen with transparency and including a display panel equipped with a polymer-dispersed liquid crystal layer and a lighting unit arranged along the side of the display panel.

The transparent display disclosed in Japanese Unexamined Patent Application Publication No. 2021-033043 has a lighting unit in which a light emitting diode (LED) and a lens unit are mounted on a wiring substrate, and the lighting unit is mounted to a glass substrate that constitutes the display panel to illuminate light from the side of the display panel. This lighting unit has a structure in which the position for fixing the lighting unit is limited.

SUMMARY

A display device in an embodiment according to the present invention includes a display panel including a polymer-dispersed liquid crystal layer between a pair of substrates, a transparent substrate disposed on at least one side of the display panel, and a lighting unit configured to project light from the side of the transparent substrate. The lighting unit includes at least one light source, at least one light guide incident with the light emitted from the light source, and a support member having an L-shaped cross section and extending along one side of the display panel to which the at least one light source and the at least one light guide are fixed. The at least one light source and the at least one light guide are disposed on different sides of the support member. The lighting unit is fixed to the transparent substrate or the display panel by the support member with the at least one light guide positioned on the side of the transparent substrate.

DESCRIPTION OF EMBODIMENTS

Hereinafter, embodiments of the present invention are described with reference to the drawings. However, the present invention can be implemented in many different aspects, and should not be construed as being limited to the description of the following embodiment. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to the previous drawing may be given the same reference sign (or a number followed by a, b, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

1. Lighting Unit

Figure 1A:
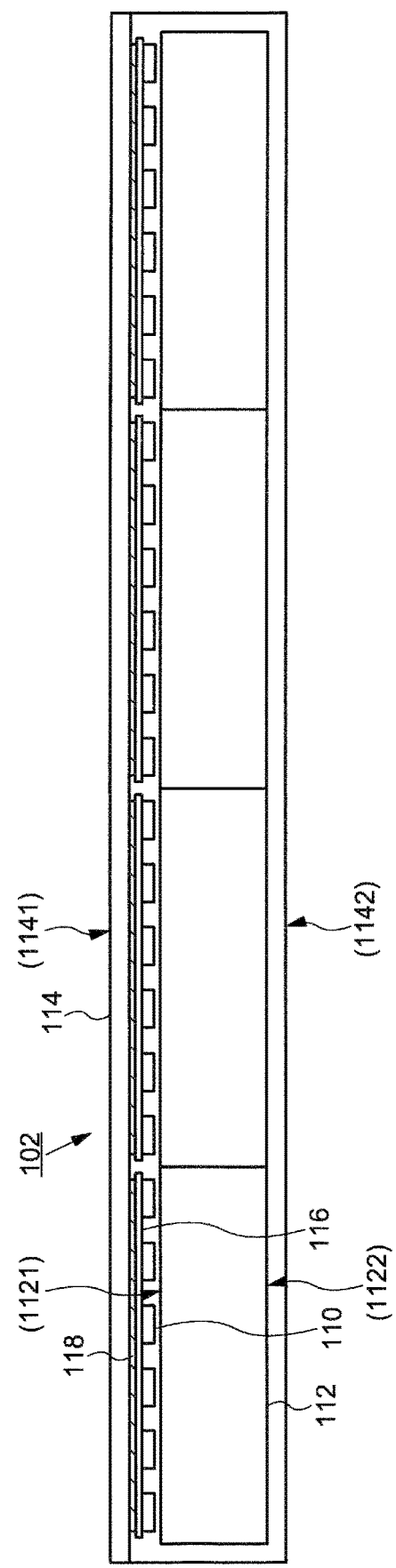
FIG. 1A is a plan view of a lighting unit used in a display device according to an embodiment of the present invention.
Figure 1B:
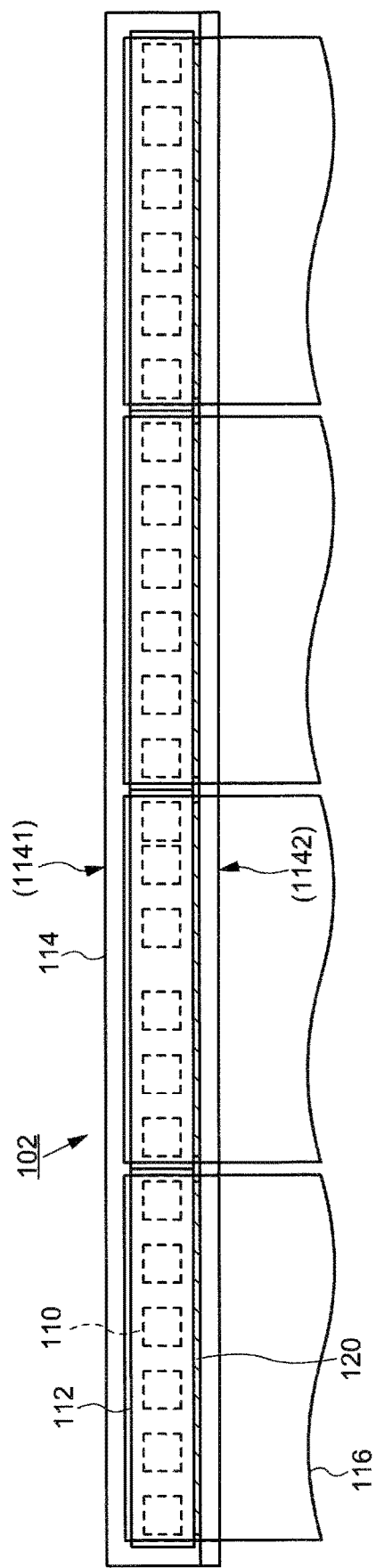
FIG. 1B is a front view of a lighting unit used in a display device according to an embodiment of the present invention.

A configuration of a lighting unit disposed in a display device according to an embodiment of the present invention will be described in detail while referring to the drawings. FIG. 1A is a top view of a lighting unit 102 and FIG. 1B is a front view of the lighting unit 102. The lighting unit 102 includes at least one light source 110, at least one light guide 112, and a support member 114.

The support member 114 has an L-shaped cross section and a shape that extends in one direction along one side of a display panel (not shown). The support member 114 includes a flat portion, which can be divided into two parts: a first flat portion 1141 and a second flat portion 1142. Distinctions of the first flat portion 1141 and the second flat portion 1142 do not imply that the support member 114 is formed from two portions, and these designations are used to describe the portions of the support member 114. There are no limitations to the method of manufacturing the support member 114 with an L-shaped cross section, and it may be made by bending a flat plate, by extruded molding, or by joining two plate members.

FIG. 1A and FIG. 1B are diagrams showing that the at least one light source 110 is made up of a plurality of light sources 110, and the lighting unit 102 in which the plurality of light sources 110 are disposed along a longitudinal direction of the support member 114. The plurality of light sources 110 are mounted on a first wiring board 116. The first wiring board 116 mounted with the plurality of light sources 110 is mounted to the support member 114. The first wiring board 116 is, for example, a printed circuit board (PCB), but may be replaced with a flexible printed circuit board (FPC). The first wiring board 116 mounted on the plurality of light sources 110 is bonded to the first flat portion 1141 of the support member 114 by a first adhesive layer 118. FIG. 1A and FIG. 1B show that the at least one light guide 112 is made up of a plurality of light guides 112, and the lighting unit 102 in which the plurality of light guides 112 are disposed along the longitudinal direction of the support member 114. Each of the plurality of light guides 112 is fixed to the support member 114 by a second adhesive layer 120. The lighting unit 102 according to this embodiment has a structure in which the plurality of light sources 110 and the plurality of light guides 112 are disposed in one direction on the support member 114 extending in one direction.

The plurality of light sources 110 includes a light source that emits red light, a light source that emits green light, and a light source that emits blue light. The light sources 110 corresponding to each color are disposed along the longitudinal direction of the support member 114. As the plurality of light sources 110, for example, light-emitting diodes (hereinafter also referred to as "LEDs") are used. The LED used as the plurality of light sources 110 in this embodiment is preferably a LED called a top-view type in which light is emitted from a surface opposite to a mounting surface on the first wiring board 116. The top-view type LED is applied as the light source 110, which makes it possible to reduce thickness and increase the intensity of emitted light. With such a configuration, it is possible to apply the lighting unit 102 according to this embodiment to a large-screen display device.

When the display device is not for color display, a monochromatic light source or a white light source may be used as the light source 110. The light source 110 may be a single component modularized with a plurality of LED chips. A cold cathode tube may also be used as the light source 110.

As shown in FIG. 1A, the light guide 112 has a light incidence surface 1121 and a light exit surface 1122. The light emitted from the light source 110 is incident to the light incidence surface 1121 of the light guide 112 and exits from the light exit surface 1122. The light guide 112 has a light guide path between the light incidence surface 1121 and the light exit surface 1122. The light guide 112 has a function of diffusing incident light in the light guide path to equalize the intensity distribution and emit light from the light exit surface 1122. FIG. 1A and FIG. 1B show a configuration in which the plurality of light guides 112 is glued to the second flat portion 1142 of the support member 114 and disposed along the longitudinal direction. The plurality of light sources 110 and the plurality of light guides 112 need not have a one-to-one relationship, and one light guide 112 may be disposed for the plurality of light sources 110.

Although FIG. 1A and FIG. 1B show a structure in which the plurality of light sources 110 are disposed in one direction, the present embodiment is not limited to such a structure, and the light sources that can be regarded as substantially one by integrating the light emitting parts may be used. Although FIG. 1A and FIG. 1B show a structure in which the plurality of light guides 112 are disposed in one direction, the present embodiment is not limited to such a structure, and one light guide 112 extending in one direction may be used.

A length of the lighting unit 102 is arbitrary and has a length corresponding to one side of the display panel to be mounted. The number of the plurality of light sources 110 and the plurality of light guides 112 can be set appropriately according to the length of the lighting unit 102.

Figure 2A:
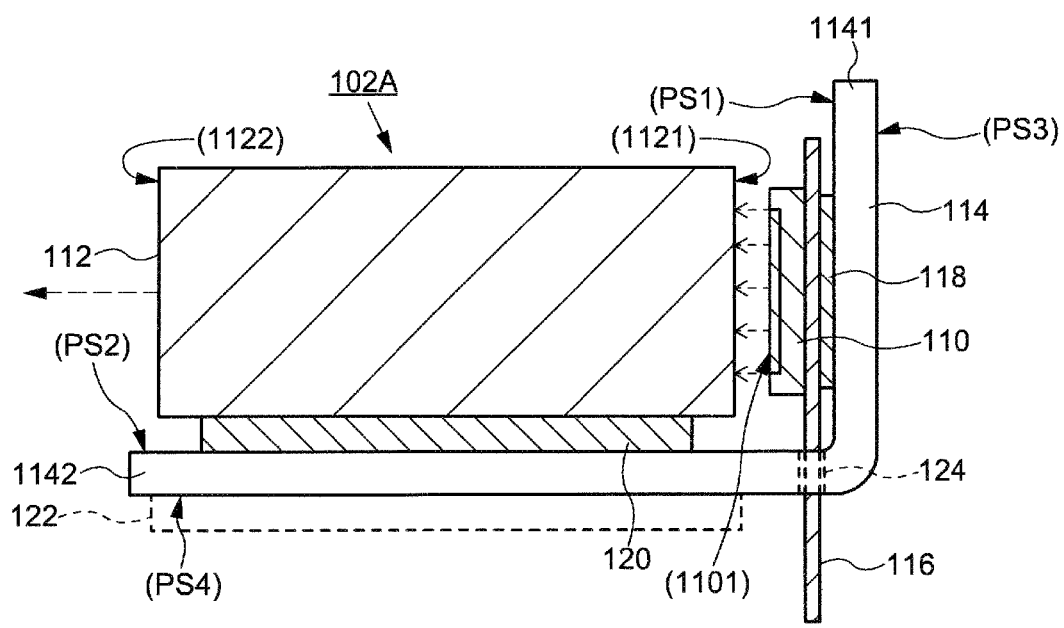
FIG. 2A is a side view of a lighting unit used in a display device according to an embodiment of the present invention.

Next, a lighting unit 102A will be described in detail while referring to FIG. 2A and FIG. 2B. FIG. 2A is a cross-sectional view of the lighting unit 102A according to this embodiment, and FIG. 2B is a partial plan view of the lighting unit 102A.

Figure 2B:
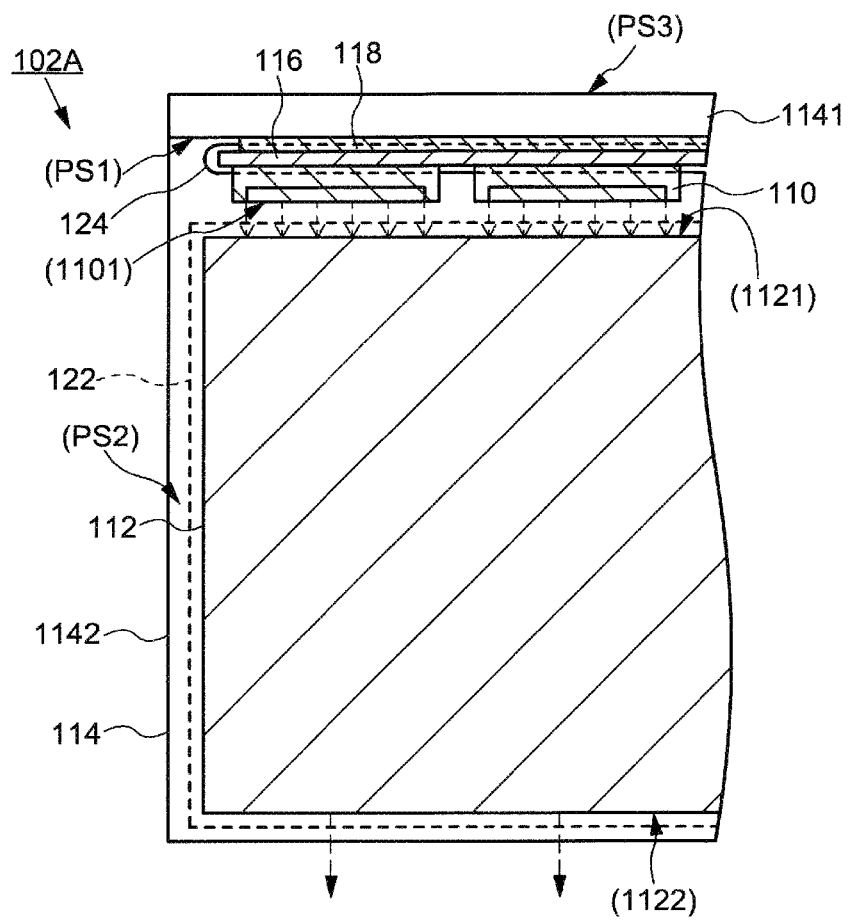
FIG. 2B is a plan view of a lighting unit used in a display device according to an embodiment of the present invention.

FIG. 2A and FIG. 2B show the case where the light source 110 is a top-view type LED. The top-view type LED has a mounting surface mounted to the first wiring board 116 and a light exit surface 1101 opposite the mounting surface. The top-view type LED is thinner than the side-view type LED, in which the light-emitting surface is formed on the side of the LED chip, and has a feature of higher light intensity.

The light guide 112 has the light incidence surface 1211 and the light exit surface 1122, and has the property of guiding light while reflecting light inside the main body to equalize the incident light intensity. The light guide 112 is, for example, formed using a transparent resin material such as acrylic or polycarbonate. The light incidence surface 1211, the light exit surface 1122, and the light guide between the light incidence surface 1211 and the light exit surface 1122 may be integrally formed by the above materials.

The support member 114 has a L-shaped cross-section shape. The support member 114 includes the first flat portion 1141 extending in a first direction from a bent portion and the second flat portion 1142 extending in a second direction intersecting the first direction. The first flat portion 1141 has a first surface PS1 and a third surface PS3 opposite to the first surface PS1. The second flat portion 1142 has a second surface PS2 and a fourth surface PS4 opposite to the second surface PS2. In other words, the support member 114 has the first surface PS1 and the second surface PS2 as an inner surface that bends in an L-shape, and the third surface PS3 and the fourth surface PS4 as an outer surface.

Note that in this embodiment, the cross-sectional shape of the support member 114 is referred to as L-shaped for simplicity. However, the cross-sectional shape of the support member 114 is not limited to the so-called L-shape, and may be expressed as an L-type, a mountain-shape or a bent-shape.

FIG. 2A shows a structure in which the light source 110 is disposed on the first surface PS1 of the support member 114 and the light guide 112 is disposed on the second surface PS2 of the support member 114. The light source 110 and the light guide 112 are disposed on different sides of the support member 114. The first surface PS1 is the surface on which the light source 110 is to be mounted, and the second surface PS2 is the surface on which the light guide 112 is to be mounted. The position and angle of the light source 110 are defined by the first surface PS1, and the position and angle of the light guide 112 are defined by the second surface PS2.

The normal direction of the first surface PS1 and the normal direction of the second surface PS2 preferably have an orthogonal relationship so that the light exit surface 1101 of the light source 110 and the light incidence surface 1121 of the light guide 112 are parallel to each other.

The support member 114 is formed of a metallic material or plastic material. It is preferable to utilize a lightweight metallic material such as aluminum or aluminum alloy, titanium or titanium alloy as the metallic material. It is preferable to use a hard plastic material as the plastic material.

The light source 110 is mounted on the first surface PS1 while being mounted to the first wiring board 116. Specifically, the surface opposite to the mounting surface of the first wiring board 116 (the surface on which the light source 110 is mounted) is the bonding surface and is bonded to the first surface PS1 of the support member 114. The first wiring board 116 is bonded to the first surface PS1 of the support member 114 by the first adhesive layer 118. The first wiring board 116 is formed of a glass epoxy material or a polyimide material. The first wiring board 116 is included with a wiring to supply power to the light source 110. Although not shown, the first wiring board 116 may have an integrated circuit that forms a control circuit, a power supply circuit, and the like, for controlling the light emission of the light source 110.

The support member 114 is formed with a slit-like through hole 124. The through hole 124 is arranged near the bent portion of the support member 114. For example, the through hole 124 is located near the portion of the support member 114 that bends in the L-shape and is arranged in the second flat portion 1142. The through hole 124 is formed so as to pass through the second surface PS2 to the fourth surface PS4 of the second flat portion 1142. As shown in FIG. 2B, the slit-like through hole 124 is disposed along the longitudinal direction of the support member 114.

The first wiring board 116 is inserted into the through hole 124. The through hole 124 in the support member 114 allows the first wiring board 116 to be extracted to the outside while it is bonded to the first surface PS1.

The light guide 112 is bonded to the second surface PS2 of the support member 114. A second adhesive layer 120 is disposed between the light guide 112 and the support member 114. The light incidence surface 1121 of the light guide 112 can be disposed so as to face the light exit surface 1101 of the light source 110, due to the support member 114 having the L-shaped cross-sectional structure. That is, since the cross section of the support member 114 has the L-shape and the normal direction of the first surface PS1 and the normal direction of the second surface PS2 are orthogonal to each other, the light exit surface of the light source 110 can be arranged parallel to and opposite to the light incidence surface 1201 of the light guide 112. In addition, the height of the light source 110 can be adjusted to match the light incidence surface 1121 of the light guide 112, since the support member 114 has an L-shaped cross section.

The third surface PS3 and the fourth surface PS4 of the support member 114 can be used as the bonding surface to mount the lighting unit 102A. That is, the third surface PS3 or the fourth surface PS4 of the support member 114 can be used as the adhesive surface in mounting the lighting unit 102A along the side of the display panel. Which of the third surface PS3 and the fourth surface PS4 is used as the adhesive surface can be selected appropriately according to the shape of the display panel and the shape of the housing surrounding the display panel.

A third adhesive layer 122 is disposed to mount the lighting unit 102A to the display panel. The third adhesive layer 122 is preferably formed of a thin bonding agent or adhesive agent. FIG. 2A and FIG. 2B illustrate, as an example, a structure in which the fourth surface PS4 is employed as the bonding surface and the third adhesive layer 122 is disposed on this surface. The fourth surface PS4 is the plane extending along the longitudinal direction of the support member 114. The adhesive surface extends over the entire length of the support member 114 by using this plane as the adhesive surface, and the lighting unit 102A can be stably bonded to the target area. The same is true for the third surface PS3 as the adhesive surface.

Figure 3A:
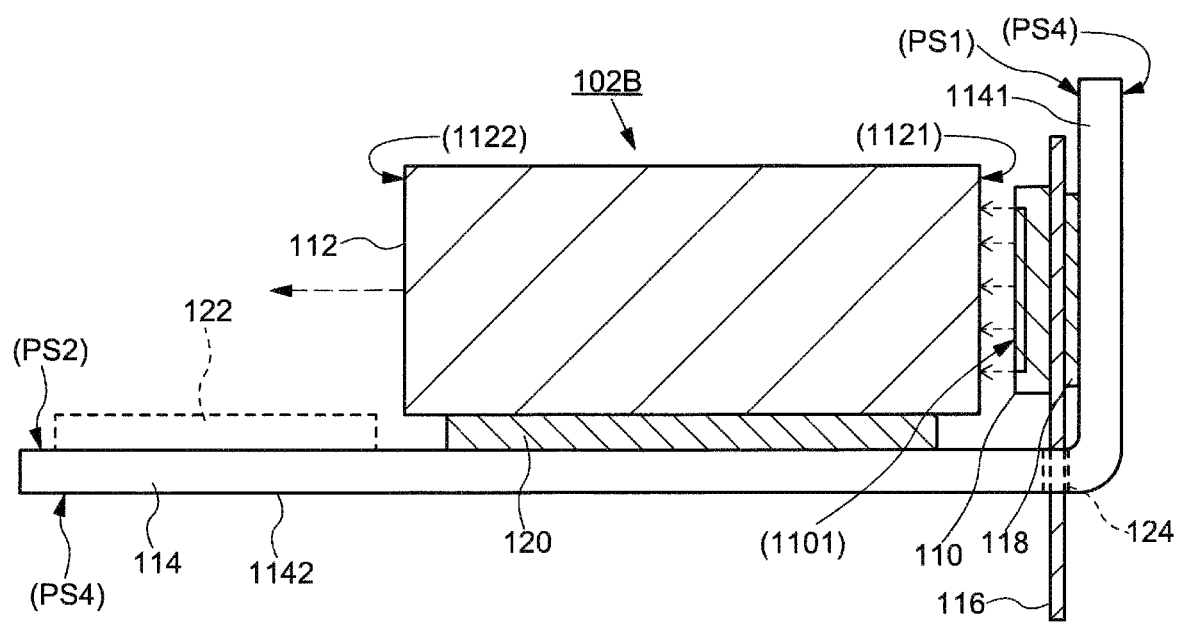
FIG. 3A is a side view of a lighting unit used in a display device according to an embodiment of the present invention.
Figure 3B:
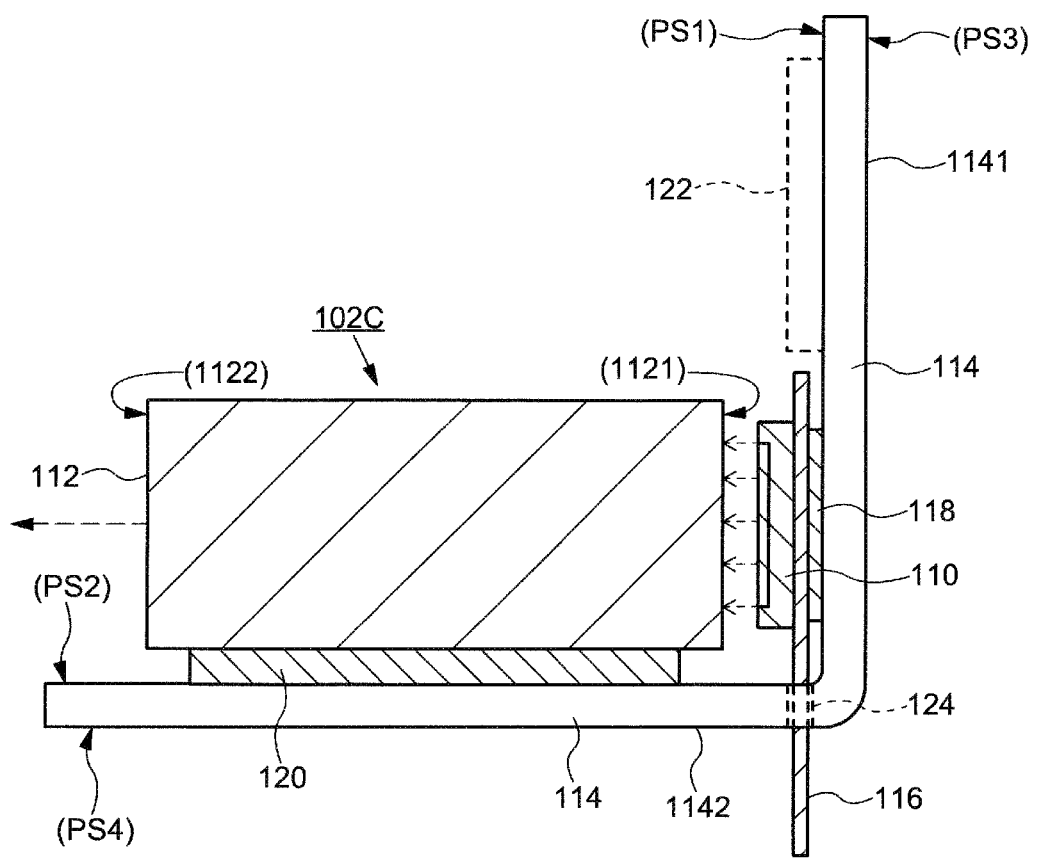
FIG. 3B is a side view of a lighting unit used in a display device according to an embodiment of the present invention.

FIG. 3A and FIG. 3B show other examples of the lighting unit according to an embodiment of the present invention. A lighting unit 102B shown in FIG. 3A and a lighting unit 102C shown in FIG. 3B have the same L-shaped cross section as the lighting unit 102A shown in FIG. 2A, except for the detailed shape of the support member 114.

The lighting source unit 102B shown in FIG. 3A has the L-shaped cross section of the support member 114 and a shape in which the second flat portion 1142 forming the second surface PS2 and the fourth surface PS4 is extended forward from the end of the light guide 112. That is, the support member 114 shown in FIG. 3A has a shape in which the second flat portion 1142 projects outward longer than the end of the light guide 112. The support member 114 having such a shape can be arranged with the light guide 112 on the second surface and further the second surface can be used as the bonding surface. In other words, the second surface PS2, which is the extended portion of the second flat portion 1142 and is the same as the surface on which the light guide 112 is mounted, can be used as the bonding surface. Also, the fourth surface PS4 can be used as the bonding surface and in this case, the area of the bonding surface can be increased.

The lighting unit 102C shown in FIG. 3B has the L-shaped cross section of the support member 114, and the first flat portion 1141 forming the first face PS1 and the third face PS3 is extended upward. In other words, the support member 114 shown in FIG. 3B has a shape in which the first flat portion 1141 projects outward longer than the end of the light source 110. The support member 114 having such a shape may utilize the first surface PS1 where the light source 110 is arranged as the bonding surface. That is, the extended portion of the first flat portion 1141, and the same first surface PS1 as the surface on which the light source 110 is mounted, can be used as the bonding surface. The third surface PS3 can also be used as the bonding surface and in this case, the area of the bonding surface can be increased.

As described above, the lighting units 102A, 102B, and 102C according to the present embodiment have a high degree of freedom with respect to the position of the bonding surface (mounting surface) due to the L-shaped cross section of the support member 114. As a result, the lighting units 102A, 102B, and 102C can be mounted to the display panel in various aspects.

2. Display Panel

Figure 4:
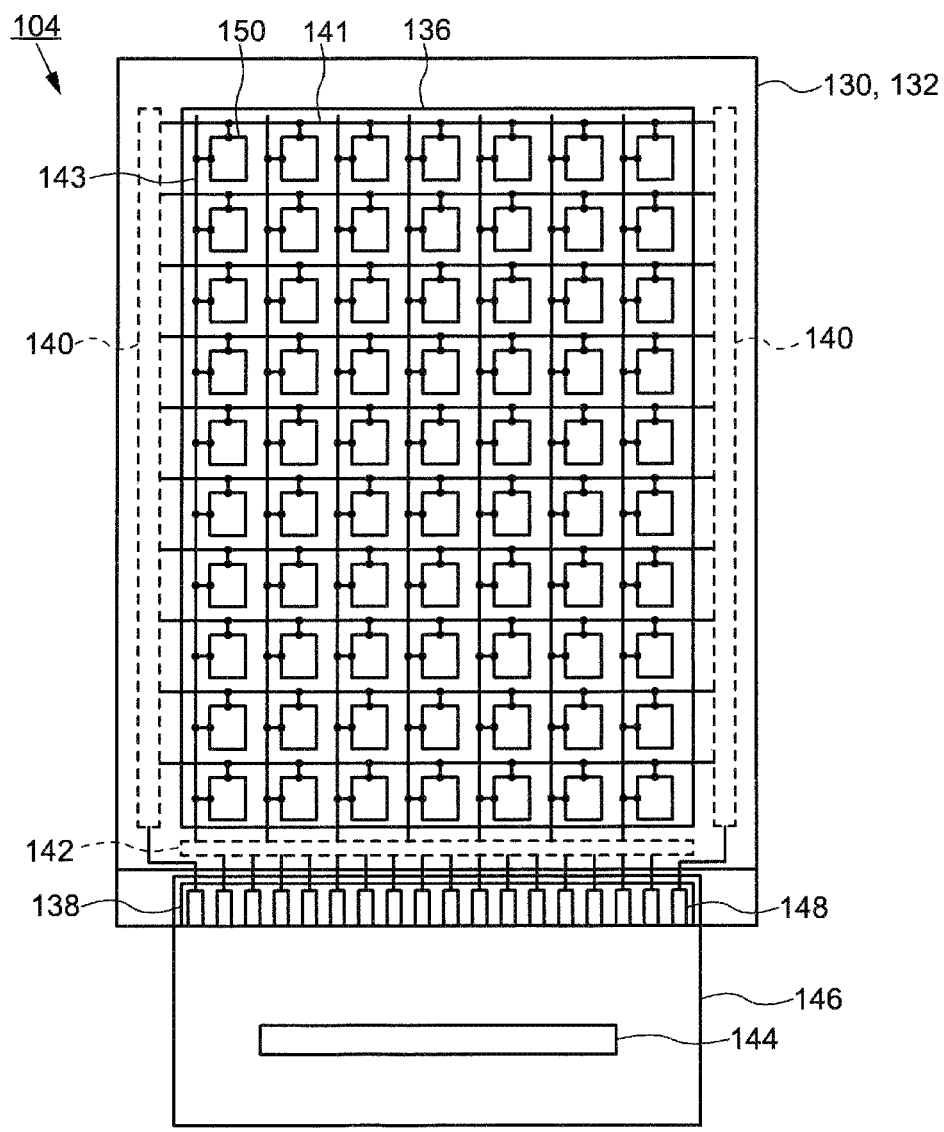
FIG. 4 is a configuration of a display panel used in a display device according to an embodiment of the present invention.

FIG. 4 shows a configuration of the display panel 104. The display panel 104 includes a first substrate 130 and a second substrate 132. A display part 136 and a terminal part 138 are disposed on the first substrate 130, and the second substrate 132 is disposed so as to overlap the display part 136. The display part 136 has a structure in which a plurality of pixels 150 are arranged. The plurality of pixels 150 may be driven by an active matrix drive system driven by thin-film transistors, or by a passive matrix drive system with electrodes arranged in a vertical and horizontal direction. FIG. 4 shows where the active matrix driving system is applied to the plurality of pixels 150. Scanning signal lines 141 and data signal lines 143 are arranged in the display part 136.

A scanning signal line driving circuit 140 and a data signal line selection circuit 142 may be disposed in an area (peripheral area) outside the display part 136. The terminal part 138 is disposed at the edge of the first substrate 130 exposed from the second substrate 132. A plurality of terminals 148 are arranged in the terminal part 138. A second wiring board 146 is connected to the terminal part 138. The second wiring board 146 is, for example, a flexible printed circuit board (FPC). A driver IC 144 may be mounted on the second wiring board 146. The driver IC 144 has a function of outputting signals such as video signals that drive the display panel 104. The driver IC 144 may be mounted on the first substrate 130.

Figure 5:
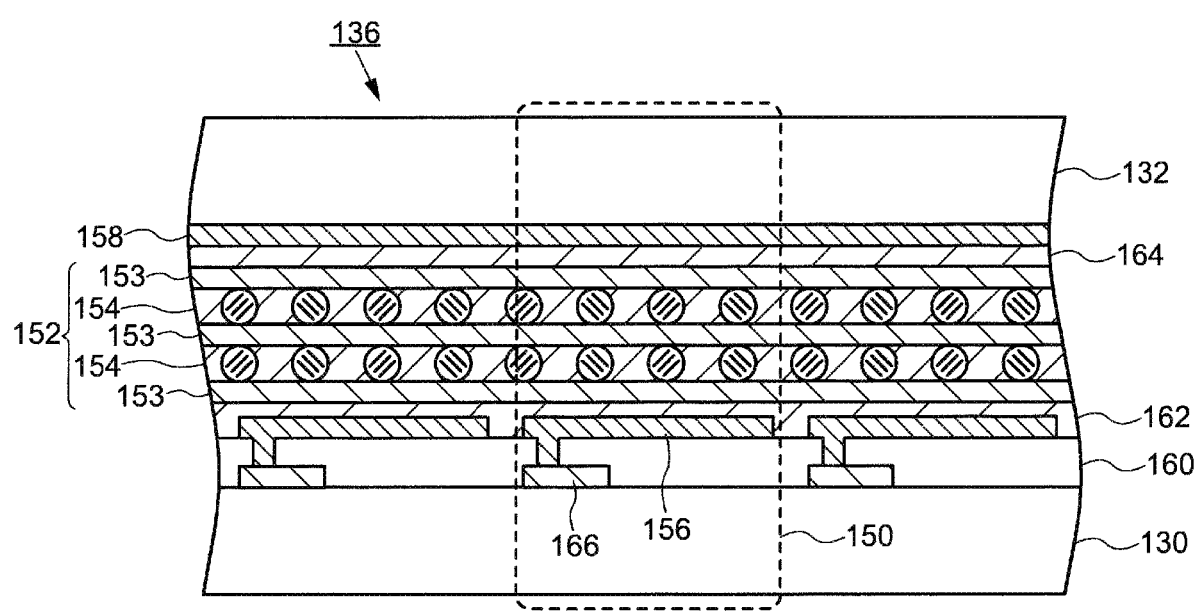
FIG. 5 is a cross-sectional view of a display part in a display panel used in a display device according to an embodiment of the present invention.

FIG. 5 shows the partial cross-sectional structure of the display part 136 in the display panel 104. As shown in FIG. 5, the display panel 104 includes the first substrate 130 and the second substrate 132, and a liquid crystal layer 152 between the first substrate 130 and the second substrate 132. The first substrate 130 and the second substrate 132 are, for example, glass substrates, while plastic substrates or flexible film substrates may also be used.

A first electrode 156 is disposed on the first substrate 130 and a second electrode 158 is disposed on the second substrate 132. The first electrode 156 is arranged according to each pixel 150, and the second electrode 158 is commonly arranged over the plurality of pixels 150. A thin film transistor 166 is deposited on the first substrate 130. The thin film transistor 166 is disposed at each of the plurality of pixels 150. The first electrode 156 is disposed on the thin film transistor 166 via an interlayer insulating film 160. The first electrode 156 is electrically connected to the thin film transistor 166 through a contact hole formed in the interlayer insulating film 160. A voltage of the first electrode 156 is controlled by the thin film transistor 166. A constant voltage is applied to the second electrode 158 in common with each pixel. With such a configuration, the voltage applied to the liquid crystal layer 152 is controlled individually for each pixel 150.

A first alignment film 162 is disposed to cover the first electrode 156, and a second alignment film 164 is disposed to cover the second electrode 158. The liquid crystal layer 152 is arranged between the first alignment film 162 and the second alignment film 164. The liquid crystal layer 152 contains a polymer-dispersed liquid crystal. Specifically, the liquid crystal layer 152 has a structure in which a polymer layer 153 and a polymer-dispersed liquid crystal layer 154 are alternately stacked.

The polymer layer 153 contains a liquid crystalline polymer. The polymer-dispersed liquid crystal layer 154 contains a polymer-dispersed liquid crystal. The polymer layer 153 and the polymer-dispersed liquid crystal layer 154 have optical anisotropy or refractive index anisotropy. The orientation direction of liquid crystal molecules in the polymer-dispersed liquid crystal layer 154 changes according to the voltage when a high voltage over the threshold voltage is applied to the first electrode 156. When a voltage lower than the threshold voltage is applied to the liquid crystal layer 152 (when no voltage higher than the threshold voltage is applied to the first electrode 156), the optical axes of the polymer layer 153 and the polymer-dispersed liquid crystal layer 154 are parallel to each other, and the light incident to the liquid crystal layer 152 is transmitted with little scattering (this state is referred to as the "transparent mode"). On the other hand, when a voltage equal to or greater than the threshold voltage is applied to the liquid crystal layer 152 (when a voltage equal to or greater than the threshold voltage is applied to the first electrode 156), the optical axes of the liquid crystal molecules of the polymer layer 153 and the polymer-dispersed liquid crystal layer 154 cross each other, and the light incident to the liquid crystal layer 152 is scattered (this state is referred to as the "scattering mode").

The state (transmission mode or scattering mode) of the liquid crystal layer 152 is controlled by the voltage (voltage based on the video signal) applied to each of the plurality of pixels 150 on the display panel 104. The display panel 104 displays images, characters, figures, and the like on the display part 136 by individually controlling the voltage applied states of the plurality of pixels 150. For example, when all of the plurality of pixels 150 are in the transmission mode, the display part 136 is transparent and the back of the display panel 104 can be seen through. On the other hand, when some of the plurality of pixels 150 are in the scattering mode and some of the other pixels 150 are in the transmission mode, the display part 136 can show any image, character, figure, and the like by contrast.

3. Display Device

Next, a configuration of a display device 100 including the lighting unit 102 described in Section 1 and the display panel 104 described in Section 2 will be described.

3-1. First Embodiment

Figure 6:
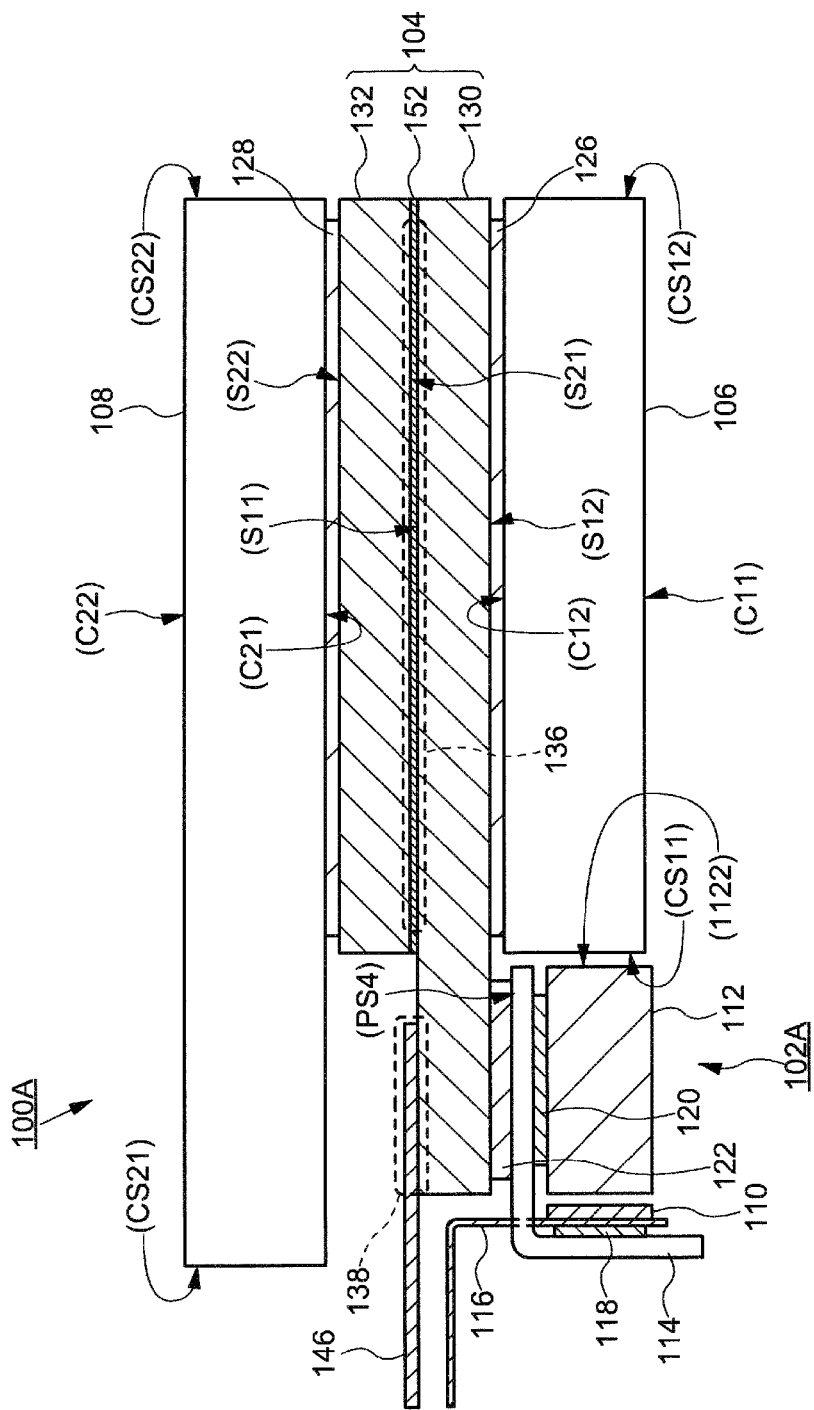
FIG. 6 is a cross-sectional view of a display device according to an embodiment of the present invention.

FIG. 6 is a cross-sectional view of the display device 100A according to the first embodiment. The display device 100A includes the display panel 104, a first transparent substrate 106, a second transparent substrate 108, and the lighting unit 102A. The display panel 104 includes the first substrate 130, the second substrate 132, the liquid crystal layer 152, and the second wiring board 146, as described while referring to FIG. 4 and FIG. 5. The display panel 104 has a display part 136. The display part 136 has a structure similar to that described while referring to FIG. 5.

The first transparent substrate 106 is disposed on a side of the first substrate 130 of the display panel 104, and the second transparent substrate 108 is disposed on a side of the second substrate 132. The first transparent substrate 106 and the second transparent substrate 108 are, for example, a glass substrate, but a plastic substrate or the like may also be used. The first transparent substrate 106 and the second transparent substrate 108 preferably have the same refractive index as the first substrate 130 and the second substrate 132 constituting the display panel 104.

The first substrate 130 of the display panel 104 has a first surface S11 and a second surface S12 opposite the first surface S11, and the second substrate 132 has a first surface S21 and a second surface S22 opposite the first surface S21. The first surface S11 of the first substrate 130 faces the liquid crystal layer 152, and the second surface S12 faces the first transparent substrate 106. The first surface S21 of the second substrate 132 faces the liquid crystal layer 152, and the second surface S22 faces the second transparent substrate 108.

The first transparent substrate 106 has a first surface C11, a second surface C12 opposite to the first surface C11, a first side surface CS11, and a second side surface CS12 opposite to the first side surface CS11. The second transparent substrate 108 has a first surface C21, a second surface C22 opposite to the first surface C21, a first side surface CS21, and a second side surface CS22 opposite to the first side surface CS21.

The second surface C12 of the first transparent substrate 106 and the first surface S11 of the first substrate 130 are disposed to face each other and are bonded by a first transparent adhesive layer 126. The first surface C21 of the second transparent substrate 108 and the second surface S22 of the second substrate 132 are disposed to face each other and bonded by a second transparent adhesive layer 128. The first transparent substrate 106 and the second transparent substrate 108 are disposed to sandwich the display part 136. The first transparent adhesive layer 126 and the second transparent adhesive layer 128 are preferably equivalent in refractive index to the first transparent substrate 106 and the second transparent substrate 108, and the first substrate 130 and the second substrate 132. The equivalent refractive index is not limited to the case where the refractive index difference is zero, and includes the case where the refractive index difference is 0.03 or less.

The first substrate 130 has a region overlapping the second substrate 132 and a region protruding from the second substrate 131. The liquid crystal layer 152 is disposed in the region where the first substrate 130 and the second substrate 132 face each other and overlap. The display part 136 is formed in the area where the liquid crystal layer 152 is disposed. The terminal part 138 is disposed in the region where the first substrate 130 protrudes from the second substrate 1321. The terminal part 138 is disposed on the first surface S11 of the first substrate 130. The second wiring board 146 is mounted to the terminal part 138. The first transparent substrate 106 is disposed so as to overlap the display part 136 from the second surface S12 side of the first substrate 130. The first transparent substrate 106 has a size that does not extend to the protrusion (the area where the terminal part 138 is disposed) of the first substrate 130. Therefore, the first substrate 130 has an area where the first transparent substrate 106 does not overlap and the second surface S12 is exposed.

The lighting unit 102A is mounted on the second surface S12 where the first substrate 130 is exposed from the first transparent substrate 106. The lighting unit 102A is bonded to the fourth surface PS4 of the support member 114. The lighting unit 102A is disposed so that the fourth surface PS4 faces the second surface S12 of the first substrate 130, and is bonded by the third adhesive layer 122. With the lighting unit 102A bonded to the first substrate 130, the light exit surface 1122 of the light guide 112 is disposed so as to face the first side surface CS11 of the first transparent substrate 106.

The lighting unit 102A can be mounted on the display panel 104 at one location on the fourth surface PS4 since the light source 110 and the light guide 112 are modularized by the support member 114. The alignment of the light exit surface 1122 of the light guide 112 with the first side surface CS11 of the first transparent substrate 106 is adjustable by the mounting position of the support member 114. In other words, since the light source 110 and the light guide 112 are mutually positioned by the support member 114, when the lighting unit 102A is mounted on the display panel 104, the positions of the light source 110 and the light guide 112 and the first side surface CS11 of the first transparent substrate 106 need not be adjusted individually.

Since the lighting unit 102A of the display device 100A shown in FIG. 6 is mounted on the surface of the first substrate 130 opposite to the terminal part 138 (the second surface S12), the first wiring board 116 on which the light source 110 is mounted can be extracted in the same direction as the second wiring board 146 mounted on the terminal part 138.

The display device 100A shown in FIG. 6 can display images, characters, figures, or the like by light emitted from the lighting unit 102A. The light source 110 mounted on the lighting unit 102A emits light to the light guide 112. Light entering the light guide 112 is emitted from the light exit surface 1122 and enters the first transparent substrate 106 from the first side surface CS11. Light incident on the first transparent substrate 106 propagates inside the display panel 104 while being repeatedly reflected. Light passing through pixels with no applied voltage is transmitted with little scattering by the liquid crystal layer 152. Light incident to the voltage applied pixel is scattered by the liquid crystal layer 152. As a result, the contrast difference between light-transmitted and light-scattered pixels becomes large, allowing the observer to see the images, letters, and figures displayed on the display part 136.

Figure 7:
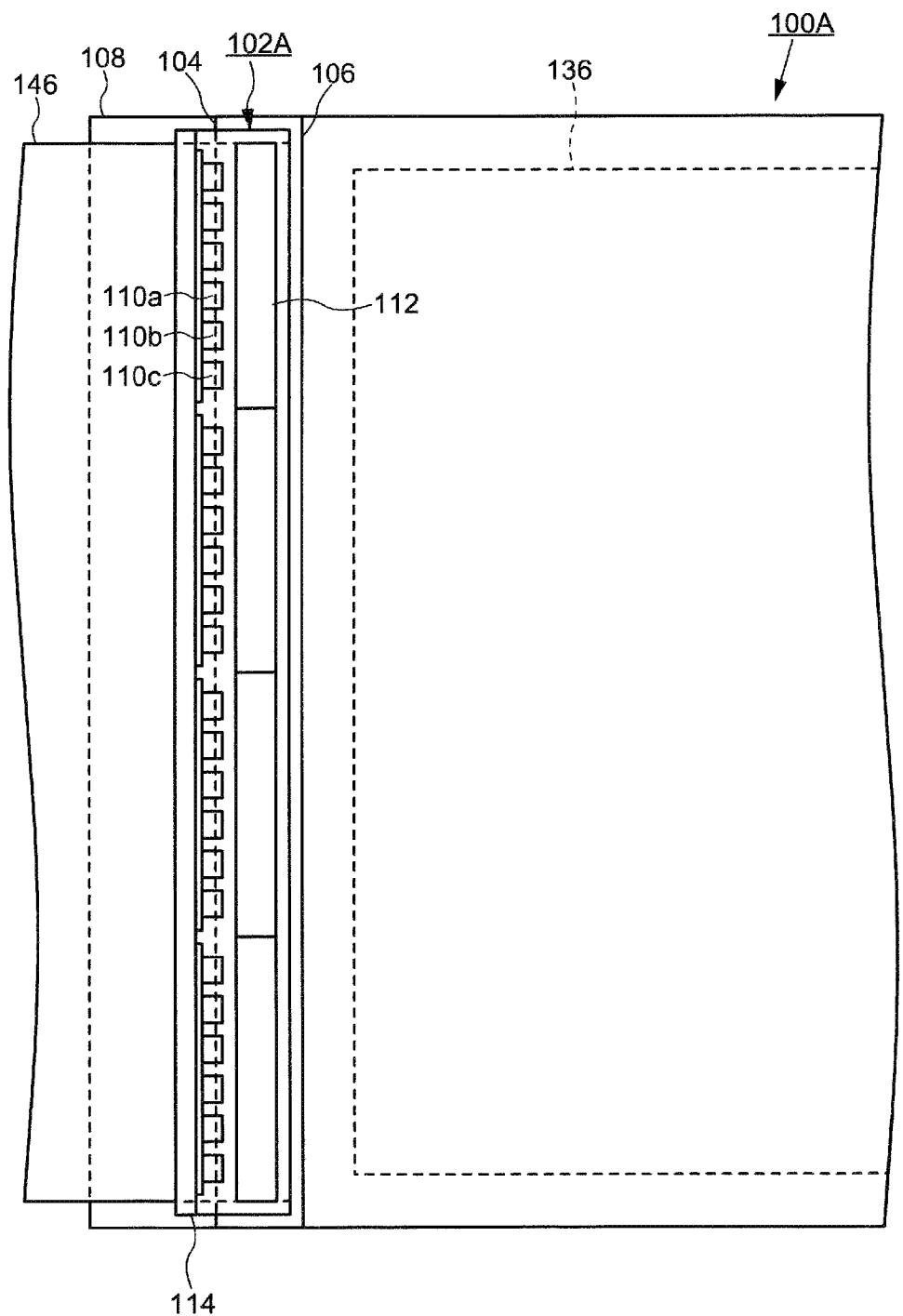
FIG. 7 is a plan view of an area around a lighting unit of a display device according to an embodiment of the present invention.

FIG. 7 is a partial plan view of the display device 100A when viewed from the side of the first transparent substrate 106. FIG. 7 shows the lighting unit 102A mounted on the display panel 104. The lighting unit 102A is disposed with a plurality of light sources 110. The plurality of light sources 110 includes a first light source 110a of a first emission color, a second light source 110b of a second emission color, and a third light source 110c of a third emission color. For example, the first emission color corresponds to red, the second emission color corresponds to green, and the third emission color corresponds to blue. Thus, the lighting unit 102A has a structure in which the first light source 110a, the second light source 110b, and the third light source 110c emitting a plurality of single colors are arranged in the longitudinal direction of the support member 114.

The display device 100A is driven in a field-sequential method. The display device 100A decomposes one frame of the video signal into fields equal to the number of monochromatic light sources or fields equal to an integral multiple of the number of monochromatic light sources, and sequentially displays the fields on the display panel 104. The lighting unit 102A emits a monochromatic light source corresponding to the color components of each field according to the field frequency. According to such a driving method, a color image can be displayed without using a color filter. In other words, the color image can be displayed while maintaining the transparent state of the display part 136, by driving the display device 100A in a field-sequential method.

The display part 136 of the display device 100A can be observed from both the first transparent substrate 106 side and the second transparent substrate 108 side. When no voltage is applied to the liquid crystal layer 152, the background can be seen through the display part 136 from the first transparent substrate 106 side, and the background can also be seen through the display part 136 from the second transparent substrate 108 side. That is, the display device 100A according to the first embodiment can be used as a transparent display.

The display device 100A shown in FIG. 6 can use a top-view type LED with high output in the lighting unit 102A. Thus, it is possible to display high-contrast images while still being a transparent display. In addition, it is possible to deal with the large size of the display part 136 (display screen). The lighting unit 102A can compactly house the light source 110 and the light guide 112 by using the support member 114 with the L-shaped cross section, and the relative positions of the light source 110 and the light guide 112 can be precisely arranged.

3-2. Second Embodiment

Figure 8:
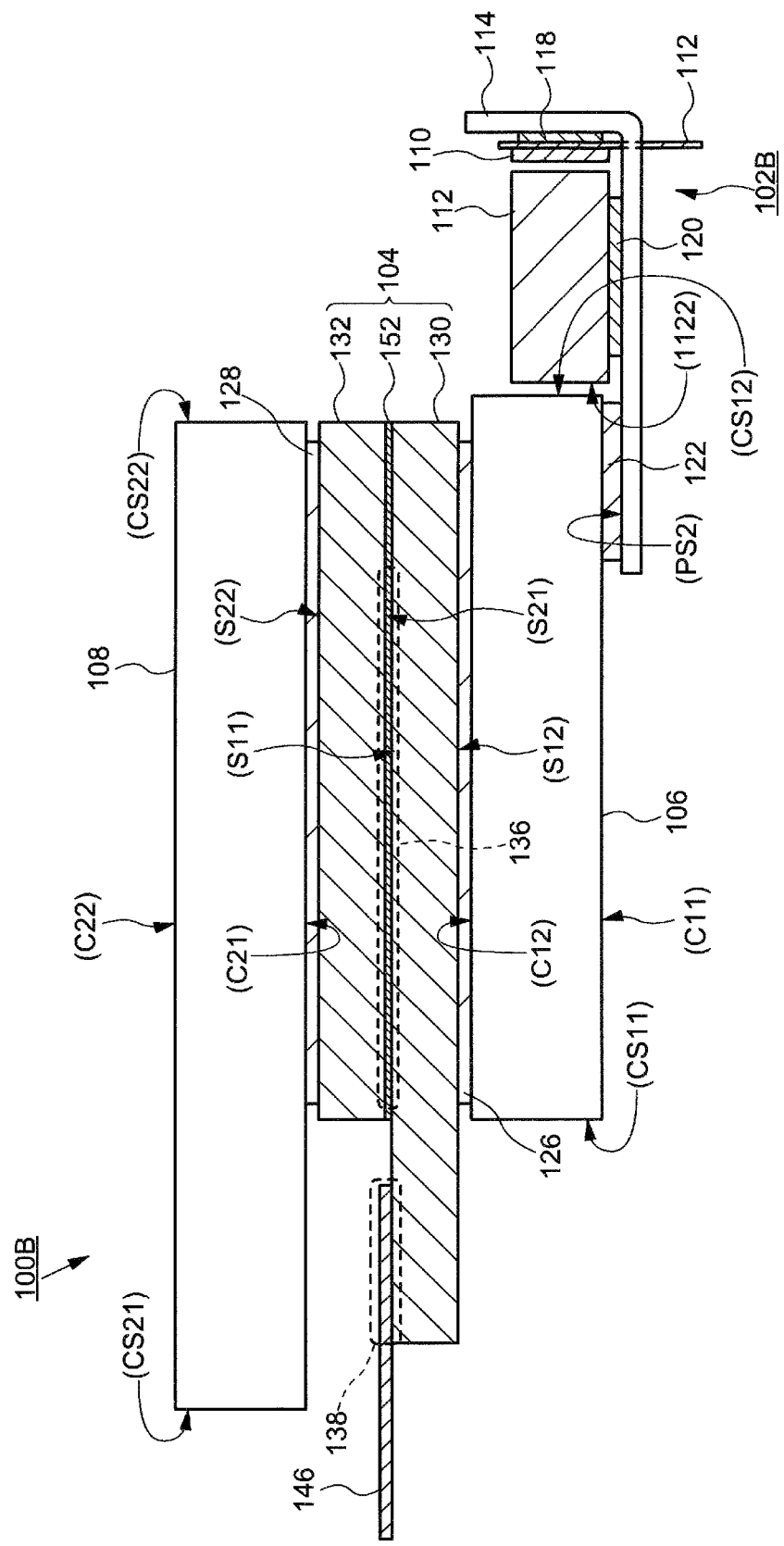
FIG. 8 is a cross-sectional view of a display device according to an embodiment of the present invention.

FIG. 8 shows a cross-sectional view of the display device 100B according to the second embodiment. The display device 100B includes the display panel 104, the first transparent substrate 106, the second transparent substrate 108, and the light source unit 102B. The configuration of the display panel 104 is the same as that in the first embodiment. The arrangement of the first transparent substrate 106 and the second transparent substrate 108 is also the same as that in the first embodiment.

The display device 100B shown in FIG. 8 has a structure in which the lighting unit 102B is mounted to the first transparent substrate 106 and light enters from the side of the second side surface CS12. The lighting unit 102B is disposed so that the second surface PS2 of the support member 114 is the bonding surface and this surface faces the first surface C11 of the first transparent substrate 106. The support member 114 is bonded to the first surface C11 of the first transparent substrate 106 by the third adhesive layer 122. With the lighting unit 102B mounted to the first transparent substrate 106, the light exit surface 1122 of the light guide 112 is positioned opposite the second side surface CS12 of the first transparent substrate 106.

Figure 9:
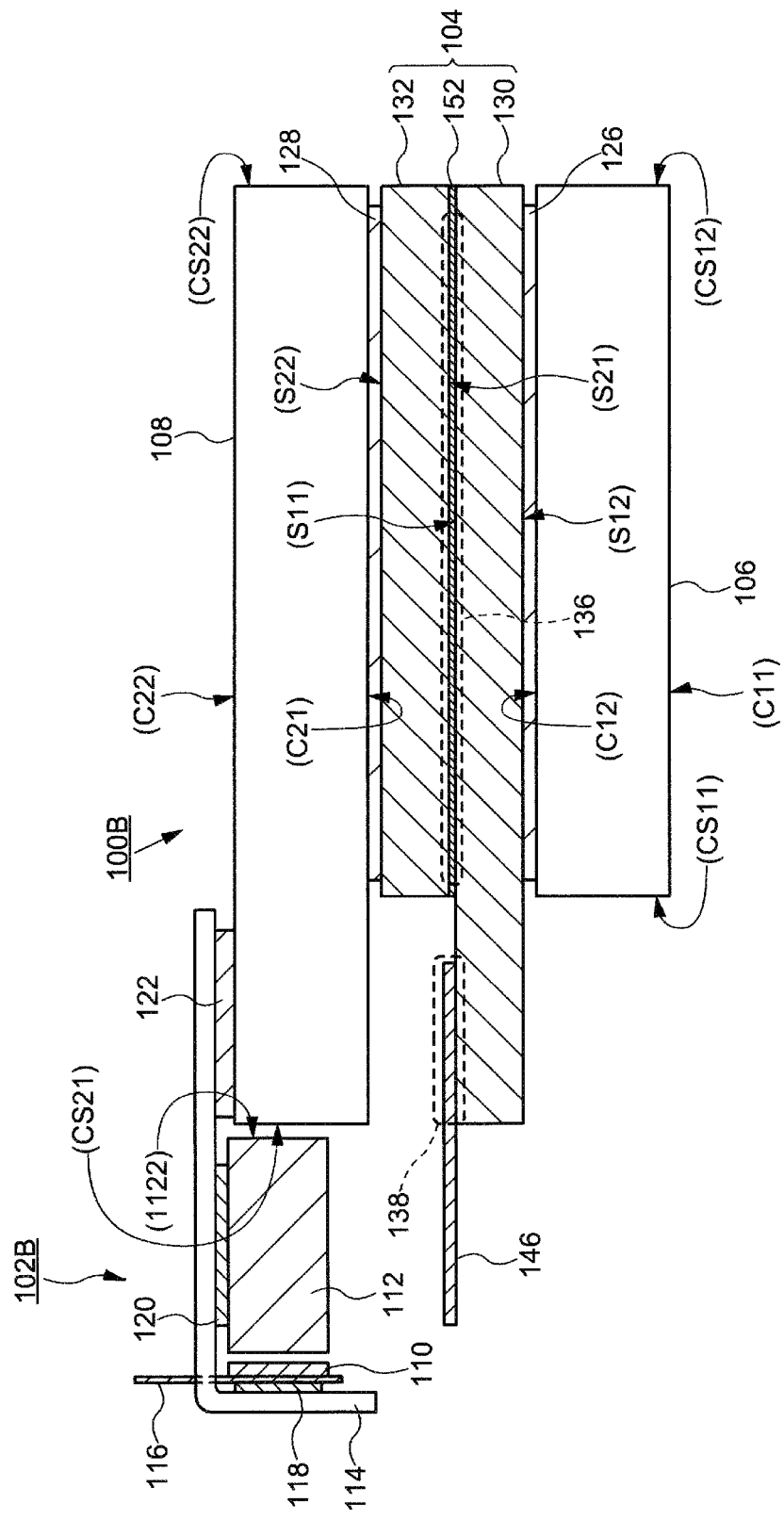
FIG. 9 is a cross-sectional view of a display device according to an embodiment of the present invention.

The display device 100B shown in FIG. 9 has a structure in which the lighting unit 102B is mounted to the second transparent substrate 108 and light enters from the side of the first side surface CS21. The lighting unit 102B is arranged so that the second surface PS2 of the support member 114 is the bonding surface and this surface faces the second surface C22 of the second transparent substrate 108. The support member 114 is bonded to the second surface C22 of the second transparent substrate 108 by the third adhesive layer 122. With the lighting unit 102B mounted to the second transparent substrate 108, the light exit surface 1122 of the light guide 112 is positioned opposite the first side surface CS21 of the second transparent substrate 108.

As shown in FIG. 9, the second transparent substrate 108 extends to an area overlapping the terminal part 138 of the display panel 104, and this area is used as the bonding surface of the lighting unit 102B. That is, the lighting unit 102B can be mounted without affecting the display part 136, by projecting the second transparent substrate 108 to the outside of the second substrate 132.

As shown in FIG. 8 and FIG. 9, the lighting unit 102B has a region where the light source 110 and the light guide 112 are modularized by the support member 114 and where the second flat portion 1142 is extended. The lighting unit 102B can be mounted to the first transparent substrate 106 or the second transparent substrate 108 utilizing the extended portion of the support member 114. The area of the extended portion of the support member 114, i.e., the area of the bonding surface, can be adjusted accordingly. The lighting unit 1026 can be firmly bonded by increasing the area of the bonding surface.

The mechanism of the display device 100B displaying images, characters, figures, and the like is the same as in the first embodiment. The display device 100B shown in FIG. 8 and FIG. 9 can be used as a transparent display similar to the display device 100A shown in the first embodiment.

3-3. Third Embodiment

Figure 10:
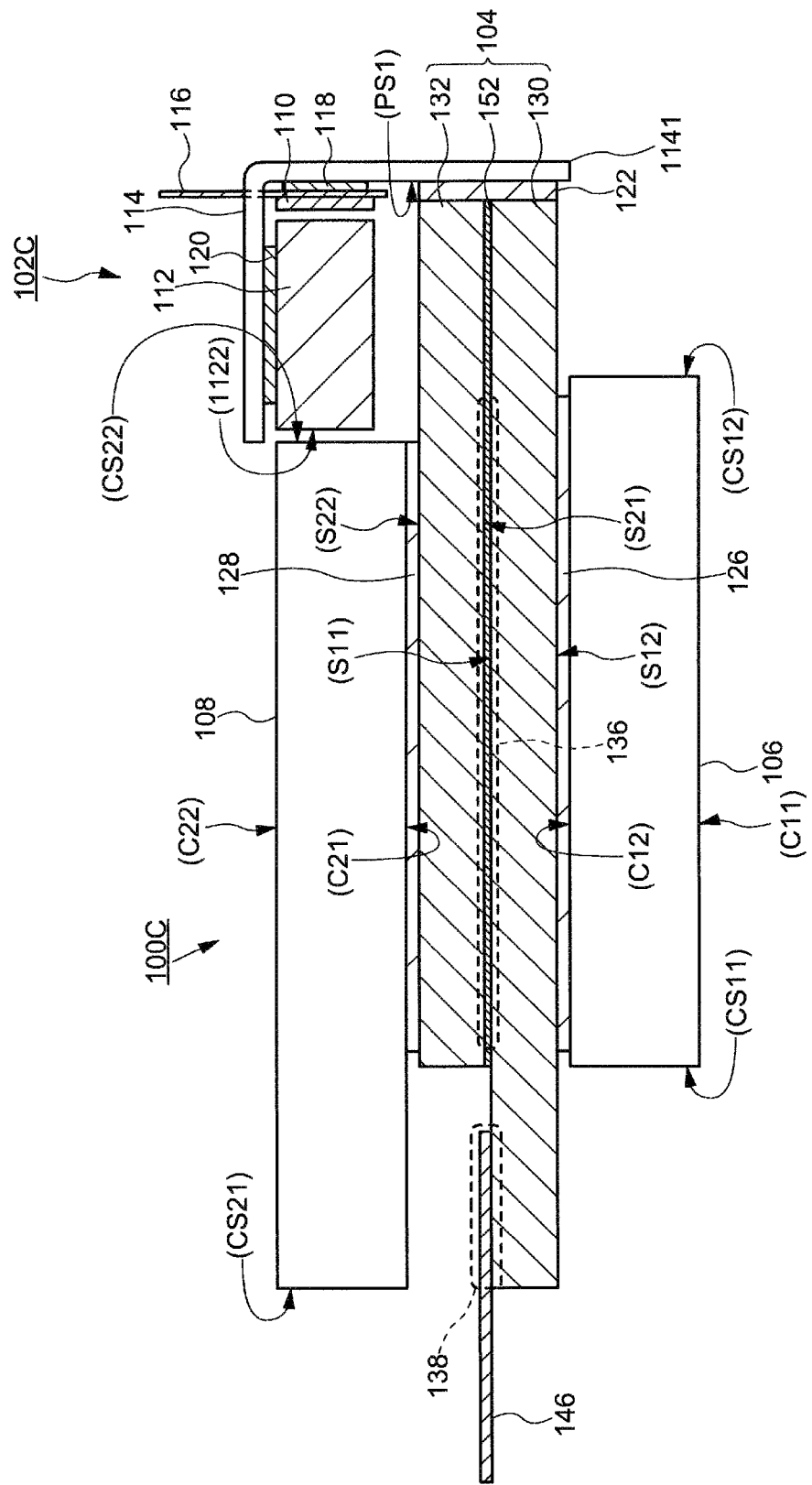
FIG. 10 is a cross-sectional view of a display device according to an embodiment of the present invention.

FIG. 10 is a cross-sectional view of the display device 100C according to the third embodiment. The display device 100C includes the display panel 104, the first transparent substrate 106, the second transparent substrate 108, and the lighting unit 102C. The configuration of the display panel 104 is the same as that in the first embodiment. The arrangement of the first transparent substrate 106 and the second transparent substrate 108 is also the same as that in the first embodiment.

The display device 100C shown in FIG. 10 has a structure in which the lighting unit 102C is mounted to the side of the display panel 104. The light source unit 102C is bonded to the first surface PS1 of the support member 114. The portion of the support member 114 extending outward from the light source 110 is arranged to face the side of the display panel 104.

The display panel 104 has a shape in which the ends of the first substrate 130 and the second substrate 132 project outward from a region sandwiched between the first transparent substrate 106 and the second transparent substrate 108. The region where the first substrate 130 and the second substrate 132 protrude from the first transparent substrate 106 and the second transparent substrate 108 is a non-display region. Although details are not shown in FIG. 10, the liquid crystal layer may not be arranged in the non-display region of the display panel 104, and the driving circuit may be arranged in this region.

The lighting unit 102C is disposed such that the first surface PS1 of the support member 114 is bonded to the end surface of the display panel 104 via the third adhesive layer 122, and the light exit surface 1122 of the light guide 112 faces the second side surface CS22 of the second transparent substrate 108. With such an arrangement, the light emitted from the light source 110 can be introduced into the display panel 104. As shown in FIG. 10, the lighting unit 102C can be mounted without affecting the display part 136 by using the side of the display panel 104 as the mounting part of the lighting unit 102C.

Although not shown, the light exit surface 1122 of the light guide 112 may be disposed to face the second side surface CS12 of the first transparent substrate 106. The first flat portion 1141 of the support member 114 may be further extended so that the first side PS1 faces the second side surface CS12 of the first transparent substrate 106, and the third adhesive layer 122 may be arranged at this facing portion to mount the lighting unit 102C.

The mechanism of the display device 100B displaying images, characters, figures, and the like is the same as in the first embodiment. The display device 100C shown in FIG. 10 can be used as a transparent display similar to the display device 100A shown in the first embodiment.

3-4. Fourth Embodiment

Although not shown, the display device 100A shown in FIG. 6 may have a similar lighting unit 102B on the side of the second side surface CS12 in addition to the lighting unit 102B on the side of the first side surface CS11. That is, the lighting units 1026 may be disposed on both sides of the first transparent substrate 106.

Although not shown, the display device 100B shown in FIG. 9 may have a similar lighting unit 102B on the side of the second side surface CS22 in addition to the lighting unit 1026 on the side of the first side surface CS21. That is, the lighting units 102B may be disposed on both sides of the second transparent substrate 108.

As described above, the lighting unit 102B is disposed on both sides of the first transparent substrate 106 or the second transparent substrate 108, so that the brightness uniformity in the plane can be enhanced even when the display panel is enlarged.

The addition, deletion, or design modification of components as appropriate by a person skilled in the art on the basis of the first to the fourth embodiments described above as the embodiment of the present invention are also included in the scope of the present invention as long as the gist of the present invention is provided. Other advantageous effects different from those produced by each of the above described embodiments that are apparent from the description herein or that can be easily predicted by a person skilled in the art will naturally be understood to be produced by the invention.

What is claimed is:

1. A display device, comprising:
    a display panel including a polymer-dispersed liquid crystal layer between a pair of substrates;
    a transparent substrate disposed on at least one side of the display panel; and
    a lighting unit configured to project light from the side of the transparent substrate,
    wherein the lighting unit comprises:
        at least one light source;
        at least one light guide incident with the light emitted from the light source; and
        a support member having an L-shaped cross section and extending along one side of the display panel to which the at least one light source and the at least one light guide are fixed,
    wherein the at least one light source and the at least one light guide are disposed on different sides of the support member,
    wherein the lighting unit is fixed to the transparent substrate or the display panel by the support member with the at least one light guide positioned on the side of the transparent substrate, and
    wherein the at least one light source is mounted on a printed circuit board, and the printed circuit board is led out through a slit-shaped through hole formed in the support member.

2. The display device according to claim 1, wherein the support member has a first flat portion extending in a first direction from a bend of the L-shaped cross section in a cross-sectional view and a second flat portion extending in a second direction intersecting the first direction, and
    the at least one light source is disposed in the first flat portion, and the at least one light guide is disposed in the second flat portion.

3. The display device according to claim 2, wherein the at least one light source comprises a plurality of light sources, and the plurality of light sources are disposed on the first flat portion in a direction in which the support member extends, and
    the at least one light guide comprises a plurality of light guides, and the plurality of light guides are disposed on the second flat portion in a direction in which the support member extends.

4. The display device according to claim 3, wherein the plurality of light sources includes a first light source having a first emission color, a second light source having a second emission color different from the first emission color, and a third light source having a third emission color different from the first emission color and second emission color.

5. The display device according to claim 4, wherein the lighting unit is configured to illuminate the first light source, the second light source and the third light source in sequence, and the display panel displays a color image in a field-sequential driving method.

6. The display device according to claim 2, wherein the second flat portion of the support member has a first surface mounted with the light guide and a second surface opposite the first surface, and the lighting unit is bonded to the display panel at the second surface.

7. The display device according to claim 2, wherein the second flat portion of the support member has a first surface mounted with the light guide, and the lighting unit is bonded to the transparent substrate at the first surface.

8. The display device according to claim 2, wherein the first flat portion of the support member has a first surface mounted with the at least one light source, and the lighting unit is bonded to the display panel at the first surface.

9. The display device according to claim 1, wherein the display panel has a display part arranged with a plurality of pixels, and the display part has transparency.

10. A display device, comprising:
    a display panel including a polymer-dispersed liquid crystal layer between a pair of substrates;
    a transparent substrate disposed on at least one side of the display panel; and
    a lighting unit configured to project light from the side of the transparent substrate,
    wherein the lighting unit comprises:
        at least one light source;
        at least one light guide incident with the light emitted from the light source; and
        a support member having an L-shaped cross section and extending along one side of the display panel to which the at least one light source and the at least one light guide are fixed,
    wherein the at least one light source and the at least one light guide are disposed on different sides of the support member,
    wherein the lighting unit is fixed to the transparent substrate or the display panel by the support member with the at least one light guide positioned on the side of the transparent substrate,
    wherein the support member has a first flat portion extending in a first direction from a bend of the L-shaped cross section in a cross-sectional view and a second flat portion extending in a second direction intersecting the first direction,
    wherein the at least one light source is disposed in the first flat portion, and the at least one light guide is disposed in the second flat portion, and
    wherein the second flat portion of the support member has a first surface mounted with the light guide, and the lighting unit is bonded to the transparent substrate at the first surface.

11. The display device according to claim 10, wherein the at least one light source comprises a plurality of light sources, and the plurality of light sources are disposed on the first flat portion in a direction in which the support member extends, and
    the at least one light guide comprises a plurality of light guides, and the plurality of light guides are disposed on the second flat portion in a direction in which the support member extends.

12. The display device according to claim 11, wherein the plurality of light sources includes a first light source having a first emission color, a second light source having a second emission color different from the first emission color, and a third light source having a third emission color different from the first emission color and second emission color.

13. The display device according to claim 12, wherein the lighting unit is configured to illuminate the first light source, the second light source and the third light source in sequence, and the display panel displays a color image in a field-sequential driving method.

\* \* \* \* \*